US012116056B2

(12) United States Patent
Apostolopoulos et al.

(10) Patent No.: US 12,116,056 B2
(45) Date of Patent: Oct. 15, 2024

(54) RECONFIGURABLE WHEEL-TRACK FOR ALL-TERRAIN MOBILITY

(71) Applicant: CARNEGIE MELLON UNIVERSITY, Pittsburgh, PA (US)

(72) Inventors: Dimitrios Apostolopoulos, Pittsburgh, PA (US); Karl Muecke, Pittsburgh, PA (US); Nishant Pol, Pittsburgh, PA (US); Edward Mutschler, Pittsburgh, PA (US); Matthew Glisson, Pittsburgh, PA (US); Richard Pantaleo, Pittsburgh, PA (US); Stephen Novick, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 484 days.

(21) Appl. No.: 17/433,627

(22) PCT Filed: Apr. 29, 2020

(86) PCT No.: PCT/US2020/030392
§ 371 (c)(1),
(2) Date: Aug. 25, 2021

(87) PCT Pub. No.: WO2020/223295
PCT Pub. Date: Nov. 5, 2020

(65) Prior Publication Data
US 2022/0161875 A1    May 26, 2022

Related U.S. Application Data

(60) Provisional application No. 62/840,179, filed on Apr. 29, 2019.

(51) Int. Cl.
*B62D 55/04*  (2006.01)
*B60B 19/00*  (2006.01)
(Continued)

(52) U.S. Cl.
CPC .............. *B62D 55/04* (2013.01); *B60B 19/00* (2013.01); *B62D 55/125* (2013.01); *B62D 55/15* (2013.01);
(Continued)

(58) Field of Classification Search
CPC ...... B62D 55/04; B62D 55/125; B62D 55/15; B62D 55/24; B62D 55/30; B60B 19/00
See application file for complete search history.

(56) References Cited

U.S. PATENT DOCUMENTS

| 2,173,793 A | 9/1939 | Doblhoff |
| 5,492,390 A | 2/1996 | Kugelmann, Sr. |

(Continued)

FOREIGN PATENT DOCUMENTS

| CN | 102514446 A | 6/2012 |
| CN | 104443088 A | 3/2015 |

(Continued)

OTHER PUBLICATIONS

International Search Report and Written Opinion for International Patent Application No. PCT/US20/30395 mailed on Aug. 3, 2020, 8 page.

(Continued)

*Primary Examiner* — S. Joseph Morano
*Assistant Examiner* — Emily G. Castonguay
(74) *Attorney, Agent, or Firm* — KDW FIRM PLLC

(57) ABSTRACT

The Reconfigurable Wheel-Track (RWT) is a novel mechanism that allows a wheel to transform into a track, and vice-versa. The wheel permits a vehicle to travel quickly over smooth and semi-rough terrain, then, on-the-fly, transform rapidly into a powered track for crossing extreme terrain. The reconfigurable wheel-track consists of several main components: an outer tire/tread, drive mechanisms for the wheel and track, support mechanisms for the outer tread (Continued)

when in either wheel mode or track mode, and a reconfiguration mechanism that facilitates the transformation from a wheel to a track and vice-versa. The reconfigurable wheel-track includes sensing, actuation, and controls to facilitate efficient and effective transition from wheel to track and vice-versa, and securely maintain each shape.

19 Claims, 8 Drawing Sheets

(51) Int. Cl.
    *B62D 55/125*     (2006.01)
    *B62D 55/15*     (2006.01)
    *B62D 55/24*     (2006.01)
    *B62D 55/30*     (2006.01)

(52) U.S. Cl.
    CPC .............. *B62D 55/24* (2013.01); *B62D 55/30* (2013.01); *B60B 2900/351* (2013.01)

(56) References Cited

U.S. PATENT DOCUMENTS

| | | | |
|---|---|---|---|
| 6,422,576 | B1 | 7/2002 | Michaeli et al. |
| 9,522,708 | B2* | 12/2016 | He .......................... B62D 55/30 |
| 9,796,434 | B2 | 10/2017 | Alidan |
| 2008/0061627 | A1* | 3/2008 | Spector ................ B62D 55/305 |
| | | | 305/180 |
| 2011/0037311 | A1* | 2/2011 | Stolkin .................. B62D 55/12 |
| | | | 180/9.5 |
| 2014/0035355 | A1* | 2/2014 | He .......................... B62D 55/30 |
| | | | 305/120 |

FOREIGN PATENT DOCUMENTS

| | | |
|---|---|---|
| CN | 105564148 A | 5/2016 |
| CN | 105774930 A | 7/2016 |
| CN | 105882774 A | 8/2016 |
| CN | 109131610 A | 1/2019 |
| CN | 109383646 A | 2/2019 |
| CN | 109649075 A | 4/2019 |
| CN | 111096113 A | 5/2020 |
| CN | 210455005 U | 5/2020 |
| CN | 210617739 U | 5/2020 |
| WO | 2019025929 A1 | 2/2019 |

OTHER PUBLICATIONS

International Search Report and Written Opinion for International Patent Application No. PCT/US20/30404 mailed on Aug. 3, 2020, 8 pages.
International Search Report and Written Opinion for International Patent Application No. PCT/US2020/030392 mailed on Aug. 4, 2020, 9 pages.
Reconfigurable Wheel Track & Extreme Travel Suspension by DARPA (DPCcars) Jun. 24, 2018 (Jun. 24, 2018) [online] retrieved from <URL:https://www.youtube.com/watch?v=8iq0Dh0Czls> entire document, especially demonstration 0:00-0:29.

* cited by examiner

RECONFIGURABLE WHEEL-TRACK FOR ALL-TERRAIN MOBILITY

RELATED APPLICATIONS

This application is a national phase filing under 35 U.S.C. § 371 claiming the benefit of and priority to International Patent Application No. PCT/US2020/030392, filed Apr. 29, 2020, which claims the benefit us U.S. Provisional Patent No. 62/840,179, filed Apr. 20, 2019, the contents of which are incorporated herein in their entirety.

GOVERNMENT RIGHTS

This invention was made with government support under contract W56HZV-16-C-0026 awarded by the DARPA. The government has certain rights in the invention.

BACKGROUND

Most wheeled vehicles are designed for efficient movement on hard road surfaces and packed dirt roads but are less efficient or struggle to operate on more extreme off-road terrains. Converting a wheeled vehicle to a tracked vehicle enables a vehicle to access more extreme terrains; however, this comes at the expense of speed, maneuverability, and efficiency of operation on hard road surfaces.

Conversion of a wheeled vehicle to a tracked vehicle is currently accomplished through commercially available track conversion kits. Conversion requires complete removal of the wheels and installation of a track unit in place of each wheel. This process can take an hour or more to complete. Track units typically limit the top speed of the vehicle to 45 miles per hour/70 kilometers per hour or less. Track units cover a breadth of scales, from small consumer-grade all-terrain vehicles with capacities of a few hundred pounds, to large agricultural equipment with capacities of many tons.

A transforming wheel/track unit would transform from wheeled mode to track mode and back without the need for replacement of the wheels with track units and vice-versa. Preferably, a transforming wheel/track unit would be able to transform between modes while the vehicle is in motion. There are currently no commercially available transforming wheel/track units. As such, it would be desirable to have a vehicle equipped with transport units that can convert on-the-fly between wheeled and track modes.

SUMMARY OF THE INVENTION

The Reconfigurable Wheel-Track (RWT) is a novel device that allows a wheel to transform into a track, and vice-versa. The wheel shape enables quick travel over smooth terrains, while the track shape increases surface area and allows for travel over extreme terrains. The RWT consists of several main components and systems: an outer tread, drive mechanisms, support mechanisms, and a reconfiguration mechanism that facilitates the wheel to track/track to wheel shape transitions.

In the wheel state, the outer tread is supported by a center structure and attached mechanisms that form the round wheel shape. Custom actuators are locked and hold the mechanisms in place, maintaining the round wheel shape. When the wheel is in the proper orientation and the custom actuators are unlocked, gravity and ground forces on the tread allows the transition from wheel to track shape to occur, and vice-versa. The custom actuators can also be locked to maintain the track shape.

A novelty of this invention is that the shape transition of the RWT can occur on-the-fly, i.e. while the vehicle is in motion. This transition is accomplished by a differential gearbox and braking system. In the wheel shape, the entire RWT, including the tread and center support structure, are rotating. As the braking mechanism engages, the center support structure is brought to a stop, while the outer tread continues to move the vehicle at a constant speed because of the differential gearbox.

DETAILED DESCRIPTION

The reconfigurable wheel-track (RWT) is a mechanical device with electronics for sensing, actuation, and controls that allows a wheel to transform into a track, and vice-versa. When in wheel mode, the device permits a vehicle to travel quickly over smooth and semi-rough terrain. When transformed to track mode, the device transforms rapidly into a powered track for crossing extreme terrain.

The RWT consists of several main components: (1) an outer tire/tread; (2) drive mechanisms for the wheel and track; (3) support mechanisms for the wheel and track; (4) a reconfiguration mechanism that facilitates the transition from a wheel to a track and vice-versa; and (5) electronics for sensing, actuation and control.

Basic Design

Figure 1B:
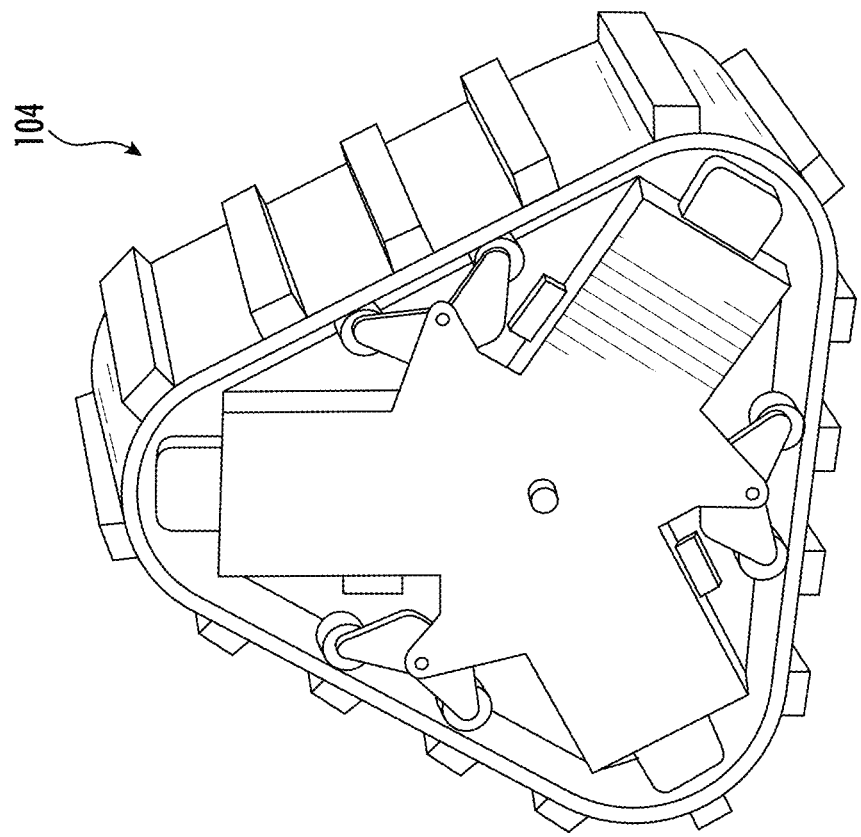
FIG. 1B shows the wheel-track assembly in track mode.
Figure 1A:
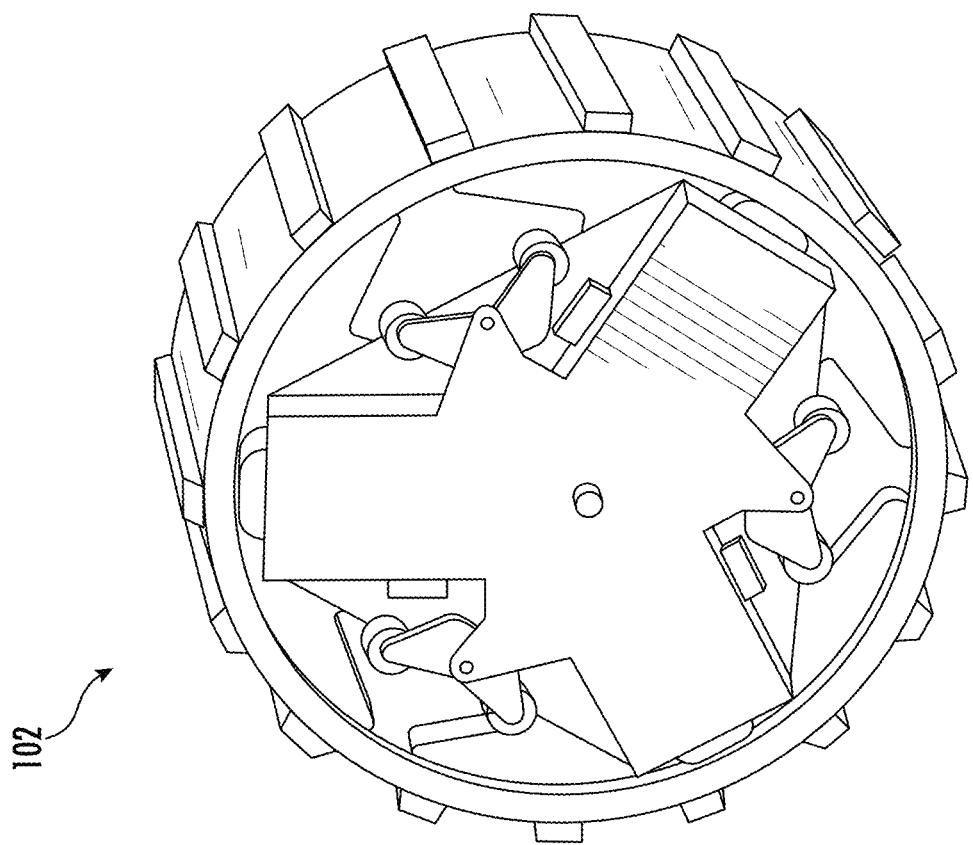
FIG. 1A shows the wheel-track assembly in wheel mode.

FIG. 1A shows the unit in wheel mode 102, wherein the outer tread is locked in place by the track drive sprockets and held rigidly around the circumference by the movable spoke support structure. The transition to track mode 104, shown in FIG. 1B, is accomplished by actuating novel mechanisms that move components in a way that a new shape of the track is attained. Once in the track mode 104, the outer tread is driven by the track drive sprockets which are driven by the drive shaft of the vehicle. The transition between modes is able to be accomplished on-the-fly, while the vehicle is in motion.

Figure 2C:
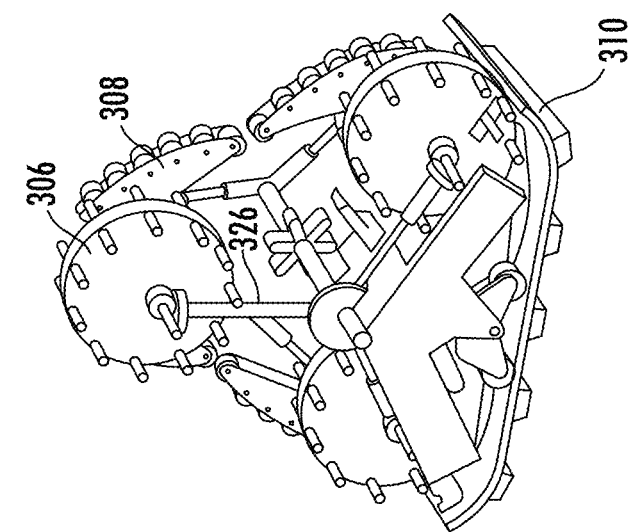
FIG. 2C is a cutaway view of the assembly in track mode.
Figure 2B:
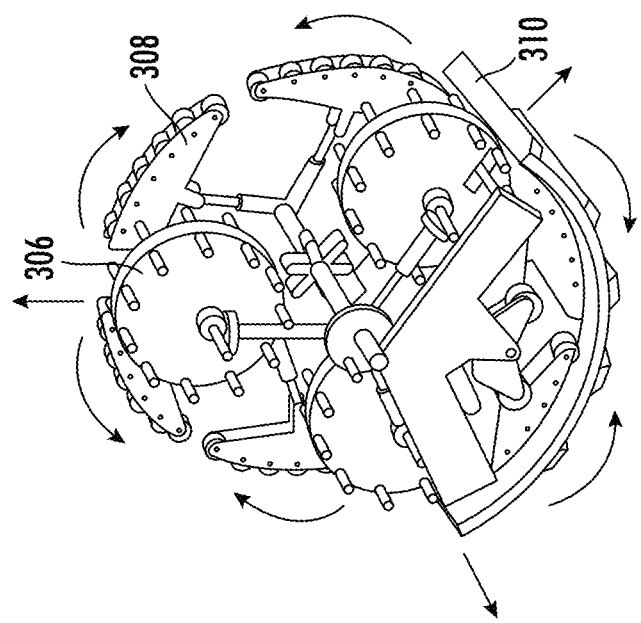
FIG. 2B is a cutaway view of the assembly as it is transitioning from wheel mode to track mode.
Figure 2A:
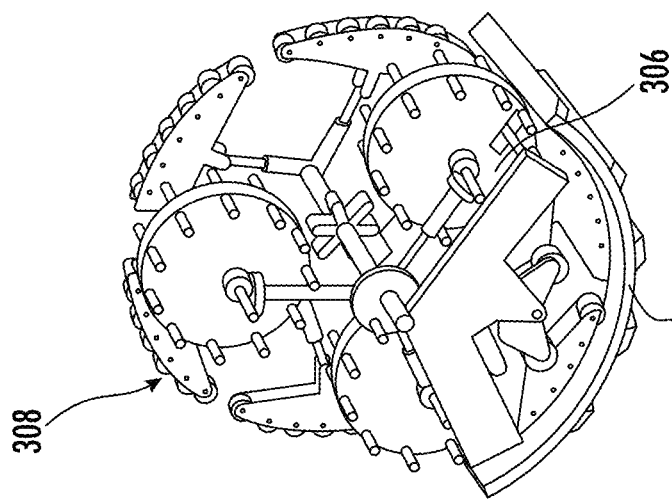
FIG. 2A is a cutaway view of the assembly in wheel mode.

This design consists of a set of sprockets (shown as reference number 306 in FIGS. 2A-2C and FIG. 3) which translate linearly and an internal support structure comprising a set of roller wings 308, resembling wings lined with small wheels, or rollers. In a preferred embodiment, three sprockets 306 make up the core of the drive system. Sprockets 306 are evenly spaced and, as shown in FIG. 2C, drive the outer tread, shown as reference number 310 in FIG. 3, in track mode 104 and during transition. When transitioning out of wheel mode 102, as shown in FIG. 2B, the outer tread 310 only contacts each sprocket 306 at a single point due to the circular shape of outer tread 310 making tangential contact with sprockets 306. In the wheel mode 102, as shown in FIG. 2A, outer tread 310 is locked in place by sprockets 306 and held rigidly around the circumference by the movable spoke support structure. The transition to track mode 104 is accomplished by actuating the sprockets 306 linearly outward, away from the center of the wheel. This pushes outer tread 310 into a triangular track shape in an embodiment where three sprockets 306 are used. Once in the track mode 104, outer tread 310 is driven by the sprockets 306, which are driven by the drive shaft of the vehicle. In this embodiment, three sprockets 306 are used, causing outer tread 310 to assume a triangular shape when in track mode 104. In other embodiments, different numbers or configurations of sprockets 306 could be used, resulting in a regular or irregular shape for the outer tread 310.

In preferred embodiments of the invention, outer tread 310 may be composed of rubber and may be configured as a single construction. In other embodiments, outer tread 310 may be composed of any other suitable material and may be configured as a segmented construction.

Each sprocket 306 is supported by a pair of moving blocks referred to herein as sprocket carriers 312. In each pair, the two sprocket carriers 312 are located axially across from each other, with the sprocket's shaft spanning the gap. As the three pairs radially spread apart, they force the shape of outer tread 310 to change from a circle to a triangle, turning the wheel structure into a usable track, as shown in FIG. 2C.

Roller wings 308 help maintain the circular shape of outer tread 310 when in wheel mode 102. The rollers on the roller wing 308 allow the tread to move separately from the main assembly as it transitions to track mode 104. In this embodiment, the roller wings 308 are mounted to the sprocket carriers 312 by a pin joint 314 and held in place by spring-loaded rods 316. The pin joint 314 and spring-loaded rods 316 allow the roller wings 308 to flex as outer tread 310 is loaded, helping to make the wheel compliant. The pin joint 314 is also important during transition because it allows roller wings 308 to fold up as the assembly transitions to track mode 104.

In this embodiment, outer tread 310 and sprockets 306 take power from the vehicle axle. In wheel mode 102, the axle directly drives the wheel assembly, giving a one-to-one connection between the axle and the wheel. In track mode 104, the axle drives the individual sprockets through the power train of the assembly. To speed up the input from the axle, as well as to lower the torque that the internal components are required to handle, the axle first drives the planet carrier of a planetary differential 317 coupled to the axle of the vehicle via central driveshaft 318. The sun gear of planetary differential 317 drives a central shaft at a 1:3 ratio with respect to the axle (when the unit is in track mode 104). The central shaft brings power to the individual sprockets through a system of bevel gears 320. The increase in speed is required for sprockets 306, which are roughly a third the diameter of the full wheel, to maintain constant ground speed during transition.

FIG. 2A shows the device in wheel mode 102, wherein each sprocket 306 is supported by its own set of sprocket carriers 312. The shape of outer tread 310 is maintained by a set of roller wings 308 having rollers disposed on the outer surface thereof. The roller wings are also mounted to the sprocket carriers 312 and held in position by rods 316. FIG. 2B shows the transition of the device from wheel mode 102 to track mode 104. During the transition, the sprocket carriers 312 are extended toward outer tread 310 and push outer tread 310 into the track shape. As the sprocket carriers 312 extend, roller wings 308 are pulled back by rods 316, folding them into the triangular shape of the tread. FIG. 2C shows the device in track mode 104, wherein the tread comes to rest against bogies 324, forming a usable track surface. In this embodiment, each sprocket 306 is powered by a telescoping, splined shaft 326, shown in FIG. 2C, that remains connected to the central shaft even as the sprocket carriers move.

Figure 3:
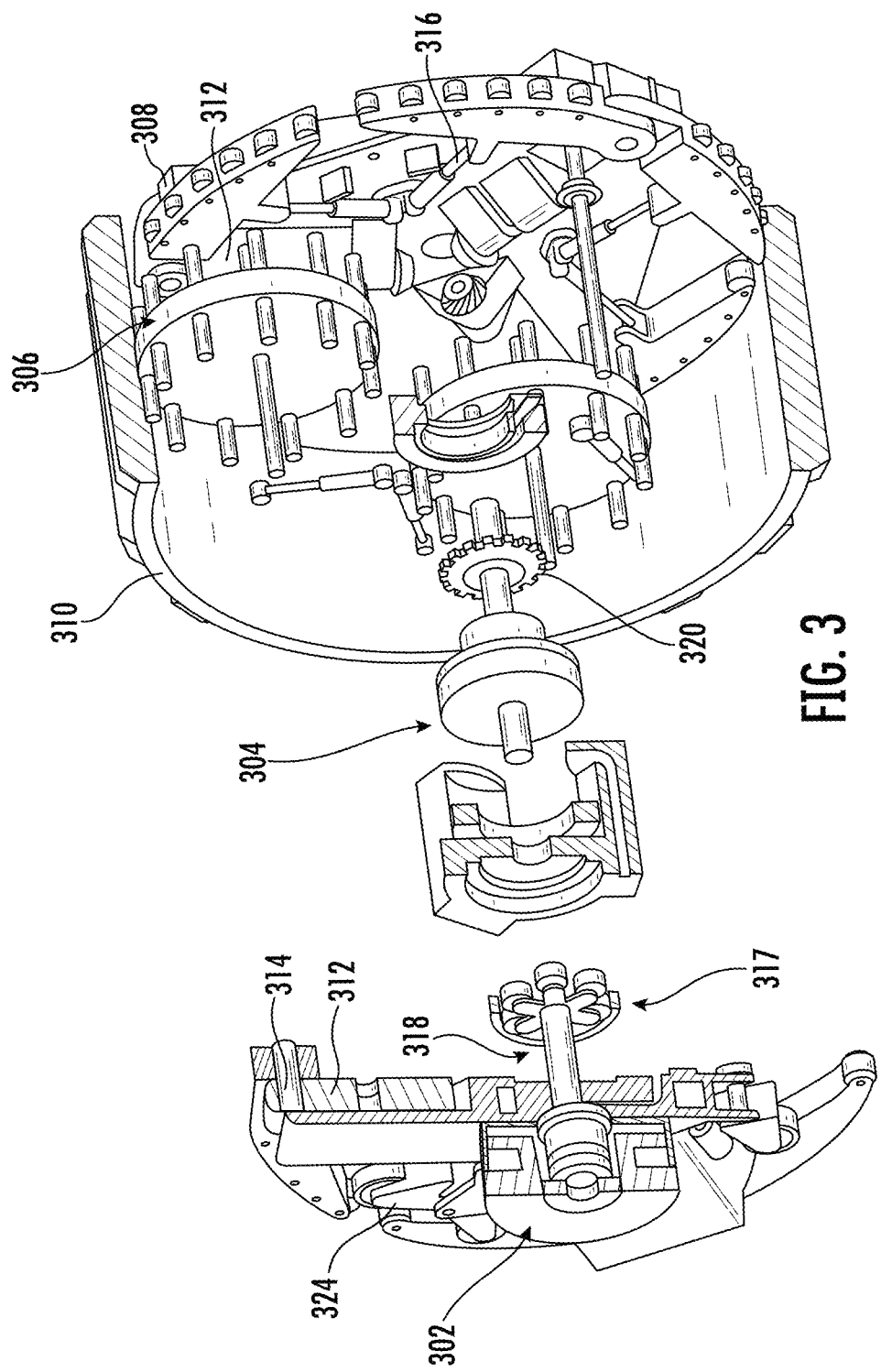
FIG. 3 shows the major subsystems and components in the powertrain.

Clutching/Braking and Transition: As shown in FIG. 3, there are two clutches in the unit: the wheel clutch 302, which locks or releases the assembly to the vehicle undercarriage, and the sprocket drive clutch 304, which locks or releases the main structure to the vehicle's axle. When in wheel mode 102, wheel clutch 302 is released while sprocket drive clutch 304 locks the structure to the axle. As the axle spins, so does the assembly, allowing it to function as a wheel. When transitioning into track mode 104, wheel clutch 302 starts to engage, slowing down the main structure of the assembly and eventually locking it in place. While the main structure slows down, sprocket drive clutch 304 is disengaged, releasing the axle from the structure and allowing it to rotate independently. As the axle spins, it drives the rest of the power train, engaging sprockets 306 and, in turn, outer tread 310. This is how the assembly can turn into a fixed structure with a rotating outer tread, preparing the way for transition into track mode 104.

In track mode 104, wheel clutch 302 and sprocket drive clutch 304 remain as they do at the end of the wheel to track transition. That is, wheel clutch 302 has locked the structure to the vehicle, while sprocket drive clutch 304 has completely disengaged, allowing the sprocket to spin freely. Now, the sprockets can move outward engage the outer tread.

Wheel clutch 302 needs to comfortably handle the output torque of the axle so that the main structure of the RWT can remain fixed to the vehicle undercarriage even if the tread becomes caught or stuck. In preferred embodiments, a maximum torque of 2700 Nm is assumed. In addition, wheel clutch 302 needs to be able to handle the maximum speed of wheel mode 102, allowing the wheel to rotate freely when the clutch is released. Assuming wheel mode 102 has a diameter of 295 mm the RWT, and thus wheel clutch 302, will need to handle speeds of 900 RPM for the vehicle to reach 150 kph.

Sprocket drive clutch 304 has similar requirements, except that it is located after the 1:3 planetary differential, so it has to deal with lower torques and higher speeds, 900 Nm and 1224 RPM, respectively.

Roller Wing Design: The roller wings 308 help maintain the circular shape of outer tread 310 when in wheel mode 102. The rollers on roller wings 308 allow outer tread 310 to begin moving separately from the main assembly as it transitions from wheel mode 102, shown in FIG. 2A to track mode 104, shown in FIG. 2C. Roller wings 308 are mounted to sprocket carriers 312 by pin joint 314 and held in place by spring loaded rods 316. Pin joint 314 and spring-loaded rods 316 allow roller wings 308 to flex as outer tread 310 is loaded, helping to make the wheel compliant. Pin joint 314 is also important during transition because it allows roller wings 308 to fold up as the assembly transitions to track mode 104. The sprocket carriers 312 carry the pivot points for roller wings 308. The motion of the sprocket carriers 312 as they move sprockets 306 inwardly and outwardly causes roller wings 308 to pivot due to the interconnection between roller wings 308 and the sprocket carriers 312.

Sprocket Carrier Articulation Mechanism: The sprocket carriers 312 that move sprockets 306 are housed in a guide track and supported by planetary roller screws. As the screws are turned by an actuator, the sprocket carriers 312 are pushed outward or brought closer to the center. Two screws support each sprocket carrier 312 and two sprocket carriers 312 support each sprocket 306, such that each sprocket 306 is supported by four planetary roller screws.

Planetary roller screws are similar to ball screws except they use a rotating ring of threaded rollers to transfer the load to the screw instead of a series of balls sitting in groves. The planetary roller screws provide more contact points than the ball screw design, which gives planetary roller screws a greater load capacity. While they are less efficient at high speeds, this is less of a concern in this application because they do not have to move very far or fast during transition.

Optimized Design

Figure 4:
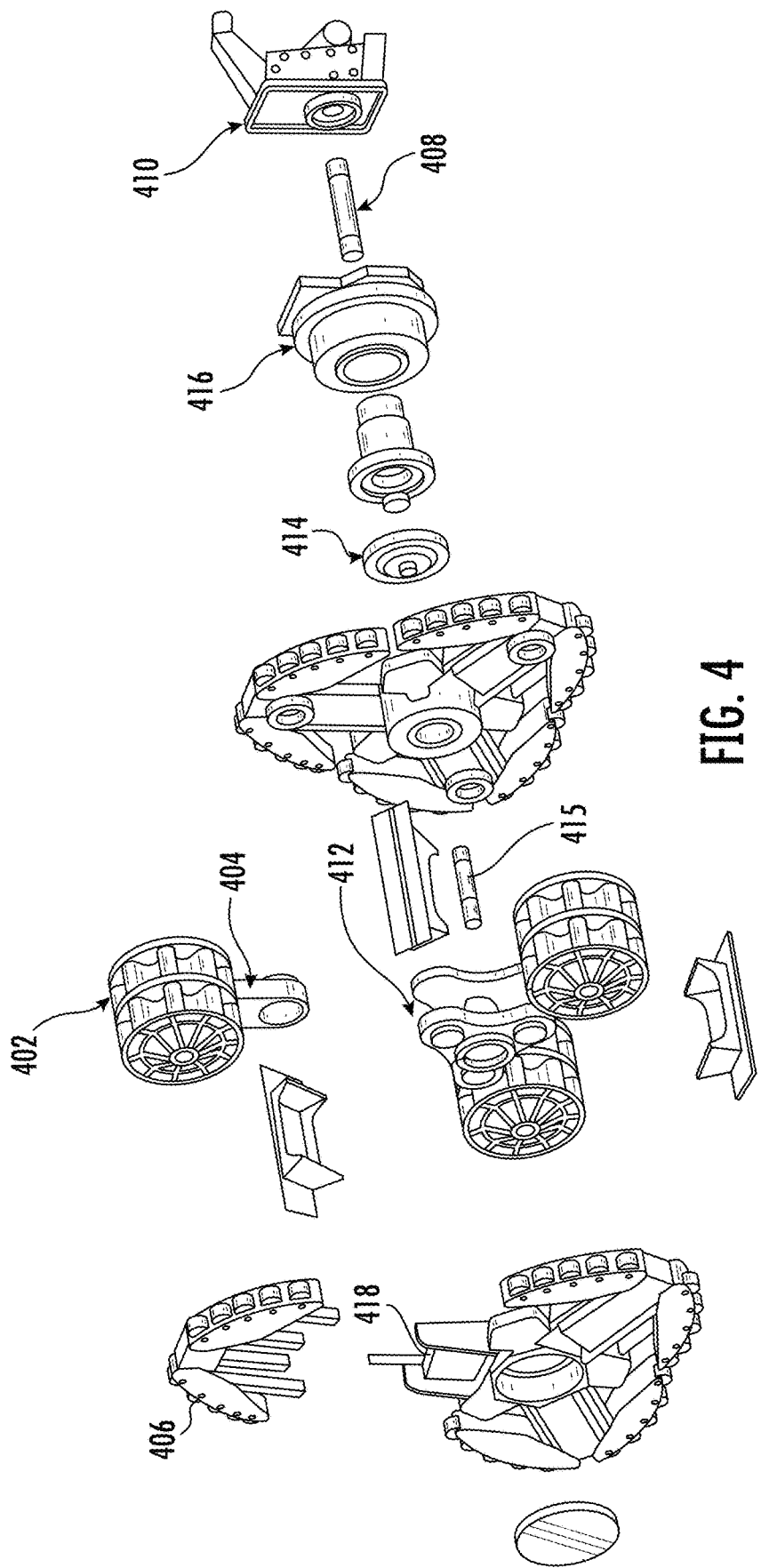
FIG. 4 is an exploded view of the optimized RWT showing all electromechanical assemblies.

An optimized design of a second embodiment was evolved from the linear sprocket and roller wing concept discussed above and is shown in FIG. 4. In this design, three sets of dual sprockets 402 are used. The sprockets 402 are axially aligned and separated by a drive gear assembly 404. As in the previous embodiment, sprockets 402 are evenly spaced and drive the tread in track mode 104 and during transition. As with the previous embodiment, each sprocket set 402 is supported by a pair of sprocket carriers. In addition, roller wings 406 are substantially identical to those used in the previously-described embodiment shown in FIG. 3.

Power to the sprockets when in track mode 104 enters the system sprocket input shaft 408 which is connected to the vehicle steering knuckle 410. Sprocket input shaft 408 is concentric to the wheel structure and runs to the planetary differential 414. The output of planetary differential 414 interfaces to sprocket output shaft 415 to the tri-lobe 412 gearing through a spline machined into it. Power is transmitted to sprockets 402 by the drive gear assembly 404. A wheel position brake 416 housed in the outer plate assembly locks the outer side plate and position of the ring gear in planetary differential 414 for operation in track mode 104. When the wheel position brake 416 is engaged, power is transmitted through planetary differential 414 to the outer link gearing. Planetary differential 414 provides a 3:1 gear-up when it is operating in track mode 104 and is necessary because of the 3:1 ratio of wheel diameter to sprocket diameter. Sprockets 402 must rotate 3 times faster than the wheel structure rotates in wheel mode 102 to maintain constant ground speed.

The RWT locks to a shape using hydraulic latches 418. There are six hydraulic latches 418 in total, two for each sprocket axle where latches can be observed on the outboard side plate. Each hydraulic latch 418 consists of a double acting cylinder with its two sides interconnected by a fluid passage, which can be blocked by a solenoid valve. When the assembly is to change shape, the solenoid valve is opened allowing the hydraulic fluid to flow between the sides of the cylinder. Once the transition is complete, the valve is closed, resulting in a solid fluid column on both sides of the cylinder. Due to the unequal areas on either side of the cylinder, an accumulator is required to compensate for the excess volume of fluid on the non-rod side.

Figure 5:
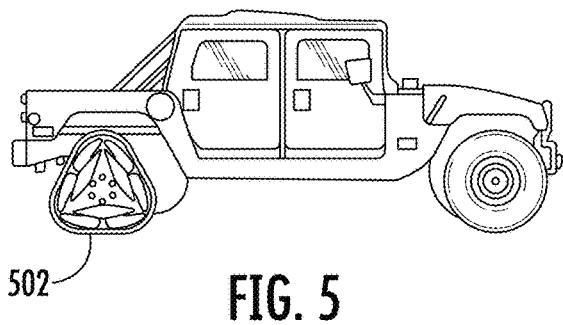
FIG. 5 shows two optimized RWT systems mounted on the rear axle of a HMMWV in half-track configuration.
Figures 6A, 6B:
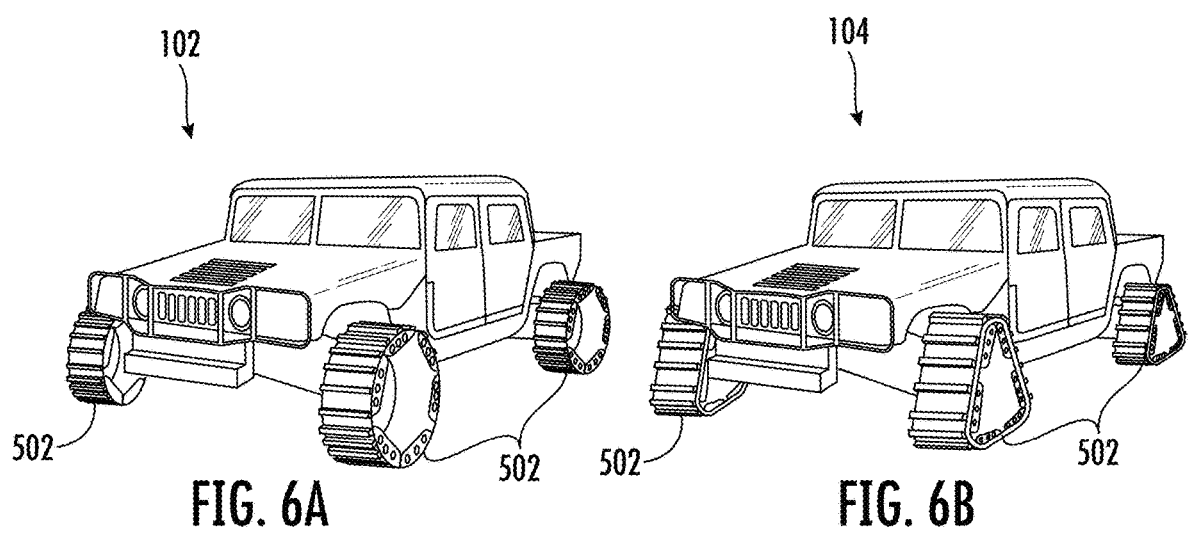
FIGS. 6A-B shows four optimized RWT systems assembled on a HMMWV; in wheel mode (FIG. 6A) and track mode (FIG. 6B).

The functionality and performance of the unit was optimized on a HMMWV vehicle. The optimized RWT replaces the conventional tires of the HMMWV. The Optimized RWTs receive torque and power from the HMMWV drivetrain through customized steering knuckle gearboxes, which interface with the vehicle's wheel axles and suspension. FIG. 5 shows the optimized embodiment in half-track configuration in which two RWTs 502 are mounted on the rear axle and, in full-vehicle configuration, in wheel mode 102 in FIG. 6A and in track mode 104 in FIG. 6B.

Electronic Control and Diagnostic Subsystem

The RWT uses an Electrical Subsystem to interface control software with actuation and sensing mechanisms in the RWT to articulate the RWT assembly. This implementation was for a HMMWV test vehicle with two or four RWT's mounted. All electronic components in the subsystem are mounted on the HMMWV test vehicle, split between locations on the vehicle chassis (off-wheel), and locations near and inside the rotating sub-assembly of each RWT (at-wheel and on-wheel).

The Electrical Subsystem manipulates the RWT assembly using solenoids that actuate hydraulic latches, and a pneumatically-controlled hydraulic brake. Feedback is provided by three encoders, and other sensors to assist control, and to record data useful for verification of control algorithms. Included in the on-wheel components is a 32-bit microcontroller used for diagnostics of on-wheel components. This section pertains to the second revision of this system having four-RWT's mounted on HMMWV.

The RWT Electrical subsystem is responsible for actuation and feedback during transitions. Specifically, it actuates solenoids in the hydraulic latches to facilitate shape transitions and reads encoders to indicate transition progress. Additionally, the Electrical subsystem monitors various parameters for debugging.

Figure 7:
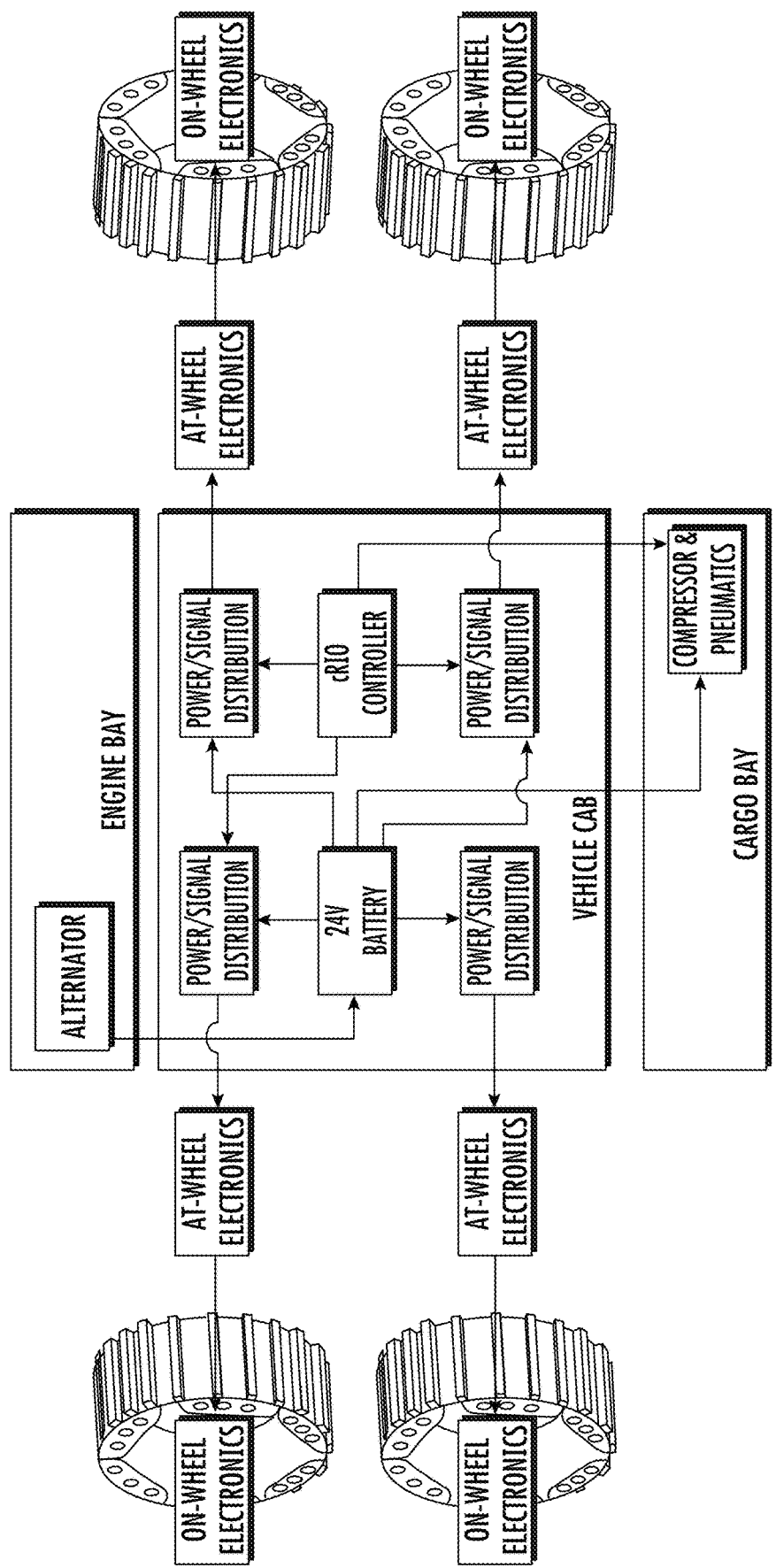
FIG. 7 shows the RWT electrical architecture.

As shown in FIG. 7, the electrical subsystem is physically divided into three locations: circuits located on the rotating assembly of the RWT (On-Wheel Electronics), in each wheel well but stationary with respect to the vehicle (At-Wheel Electronics), and in a central electronics enclosure within the vehicle cab (Central Electronics).

There are four key architectural features of the electrical subsystem. First, communication between Central Electronics and Wheel Electronics uses parallel RS422-logic level I/O lines. This design choice allows all actuation and sensing to be controlled by a single computer, rather than split between a central computer and multiple microcontrollers. Although this architecture requires many I/O lines and is not scalable, it was possible to fully test and validate the electrical subsystem on-bench before installation on the vehicle. Second, most signal processing and routing was performed on Printed Circuit Boards (PCBs) rather than COTS devices and wire harnesses. For example, power and signals between Wheel Electronics and Central Electronics were passed through a single 50-conductor cable, which terminated to identical connectors on a PCB on each end. Individual power and signal lines were re-routed on the PCB rather than through cable splices. This reduced the number of cables required in the system and allowed for verification of signal paths using ECAD tools. Third, power is sourced from on-board batteries charged with an alternator, which provides enough power such that extra current from batteries is only required during transitions. Fourth, power to each individual RWT is provided by independently isolated 200 VDC high voltage buses, monitored by the subsystem for safety.

On-Wheel Electronics: The On-Wheel PCB is located in the outboard cavity of the rotating RWT assembly and is responsible for actuating the twelve solenoids during shape changes and reading the articulation encoder that measures shape change progress. The PCB also converts the 200 VDC bus to the 48V solenoid voltage, and 3.3V logic voltages. An STM32F072 microcontroller monitors solenoid driver status, power rails, and temperature, to report wheel health. This microcontroller can also be used to control or sense existing or future components. Originally, a Renishaw RLS LA11 absolute encoder was chosen for the articulation encoder. This encoder uses a flexible magnetic tape along with a sealed read-head. Although the encoder passed bench testing, during integration testing, the read head would intermittently report tape-read head distance errors after the magnetic tape was installed on a curved surface. A new articulation encoder, a US Digital end-of-shaft encoder, was used instead of the RLS encoder. A small interface PCB was fabricated to convert the PWM output of the US Digital encoder to RS422 logic levels compatible with the existing SSI signal path designed for the RLS encoder.

At-Wheel Electronics: The At-Wheel Electronics include the At-Wheel PCB located in an enclosure inside each wheel well, and sensors located on the non-rotating portion of the RWT assembly. These sensors include the wheel encoder that measures position of the RWT assembly, and a gear tooth sensor to measure vehicle speed in track mode 104. The electronics also have provisions for a future actuated rocker system, temperature sensing, and a remote accelerometer. A separate enclosure was built to support pressure sensors to monitor high and low side air pressure in the RWT brake system.

Central Electronics: All central electronics are located within two enclosures: the battery electronics enclosure, and central electronics enclosure. The battery electronics enclosure houses two lead acid batteries and meters for manual monitoring of battery voltage and current draw. The batteries are arranged in series to provide 24V bulk power to the RWT2 system. It also contains two DC-DC converters to provide 12V to pneumatic compressors.

The central electronics enclosure contains the central computer, four power-signal distribution PCBs, local power-conversion and routing devices, and a high-gain WiFi antenna for remote monitoring and control.

Power: Power is delivered to each RWT assembly through four independent & isolated 200 VDC buses. These HVDC buses, and local low-voltage rails, are generated from a bulk 24 VDC power bus provided by Lead-Acid Batteries. A secondary alternator in the engine bay charges the batteries. The average power required by the RWT2 electronics is within the output capacity of the alternator, though the batteries must provide peak power above this capacity during shape transitions when the solenoids are active. Four series-connected Vicor DC-DC converters located on the Power-Signal Distribution PCB perform conversion of 24V bulk power to 200 VDC. Each RWT has an independently isolated 200 VDC bus and ground fault monitor to detect shorts to chassis.

Signal: All actuation and sensing is performed by software on the central computer. On each Power-Signal Distribution PCB, 1/O from the central computer is isolated, converted to RS422 logic level, and combined with the 200 VDC bus into a single cable to each wheel location. The At-Wheel PCB in each wheel-well splits 1/O and power to the On-Wheel Electronics, Gear Tooth Sensor, and Wheel Encoder. LEDs indicate signal validity and activity for quick field debugging. Also, the Power-Signal Distribution PCB isolates analog control and feedback signals for the pneumatic proportional control valves in the RWT brake system.

The Power-Signal Distribution PCB has allocated signal paths for future features, including the rocker mechanism, temperature sensing, accelerometers, and bidirectional communication to the on-wheel microcontroller.

Operator Console: The test driver was provided with switches and a touchscreen LCD to command and monitor transitions. Switches can be configured to transition all RWT's together, or in pairs. The operator display shows transition progress, vehicle speed, and RWT health.

Controls

This section focuses on the controls needed to actuate the brake system and stop the hub assembly in a specific position to enable passive shape change (or underpowered active shape change). Additionally, this disclosure describes synchronizing the transformation among multiple units on a vehicle.

Figure 8:
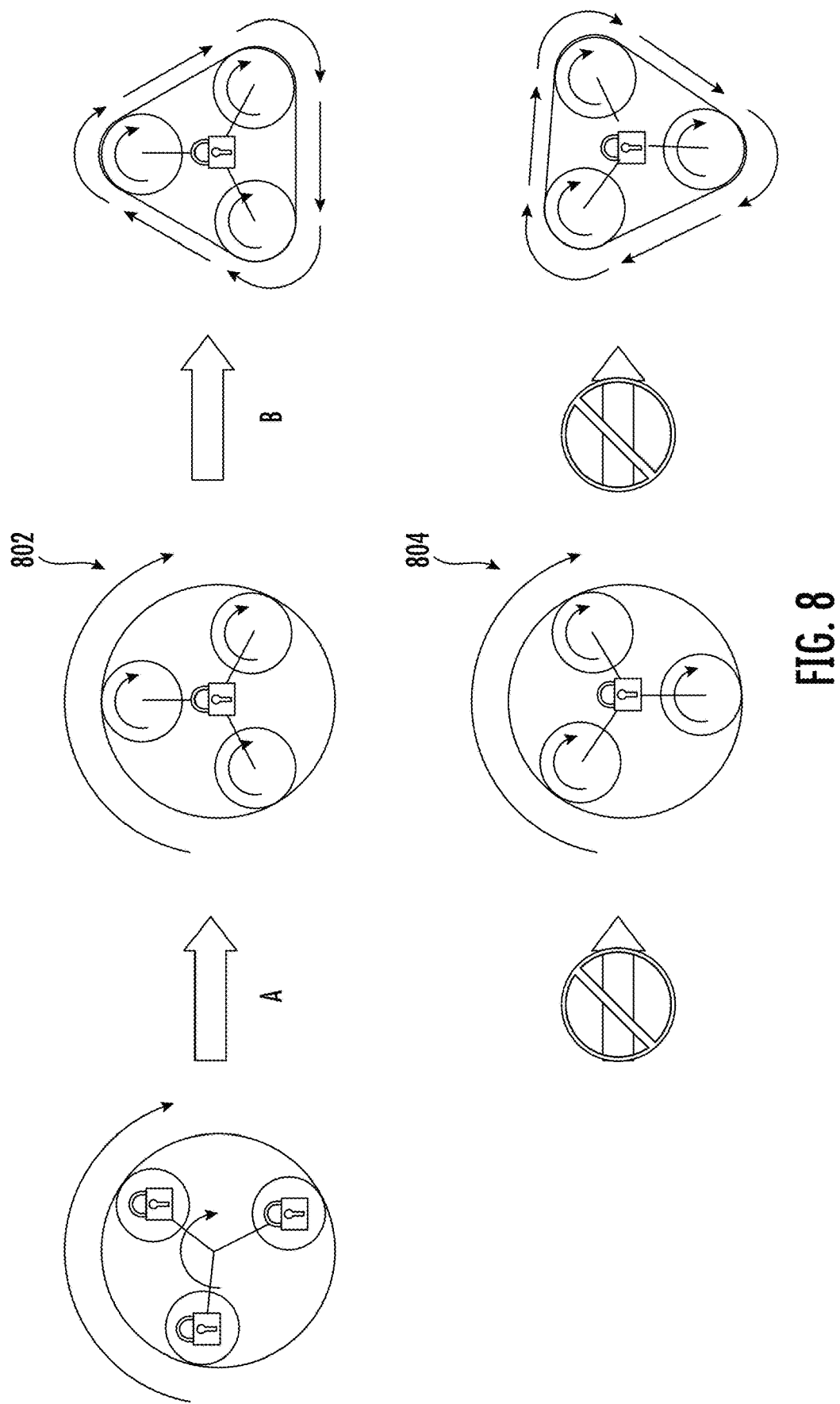
FIG. 8 is a diagram of a wheel mode to track mode transition. (A) Power transition from wheel to track. (B) Shape transition from circle to triangle. The lower portion of the drawing shows an unstable configuration where the carrier is positioned in "triangle" down mode before the shape change.

For the wheel-track system to transform from wheel to track, the system must position the carrier appropriately during power transformation so that it is in the correct position for shape change, as shown as reference 802 in FIG. 8. Reference 804 in FIG. 8 shows an incorrect positioning of the carrier for transition. There are three main inputs to the system: (1) Drive torque from drive train; (2) Road force interaction; and (3) Brake control. The road force interaction opposes the drive torque and supports the weight of the vehicle. The brake control controls the relative motion of the carrier to the vehicle body.

When transitioning power from wheel mode 102 to track mode 104, the position control will typically apply the brake to start locking the carrier to the vehicle-completely locking it into position once in the correct position. Transitioning back, the brake is released until the triangle points down, at which point the brake engages again until circular shape is restored.

Figure 9:
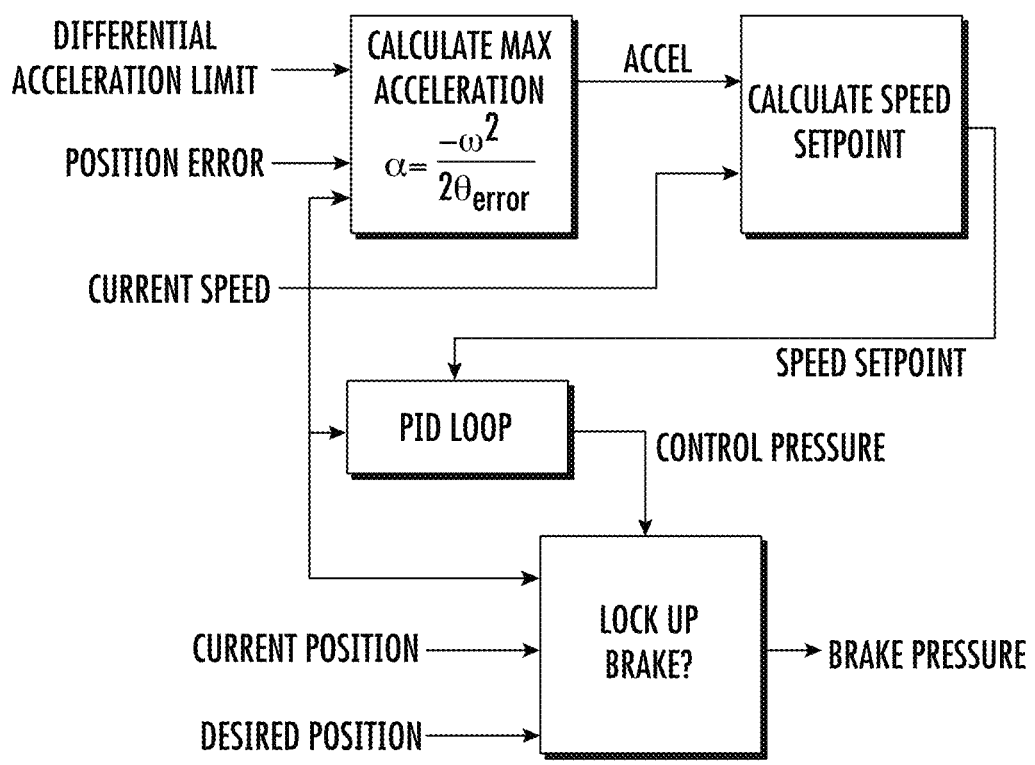
FIG. 9 is a diagram of the slow and seek position control method.

Slow and Seek Method: This method controls the brake to slow the carrier within the acceleration limits. As the carrier slows, the controller updates the desired acceleration rate so that if the carrier follows the desired speed profile, it will stop in the correct position, as shown in FIG. 9. The brake still "locks" the carrier in place when in the correct position. This method is not only accurate and effective, it is efficient and keeps the carrier accelerations within limits.

Adaptive Control: Because the resistance on the system changes quickly with road dynamics, the control needs to adapt to the environment. To address the dynamics, the controller uses the error from previously attempting to position the hub/carrier as feedback for an offset to the goal position so that when locking up the brake, the system is more likely to stop at the correct position.

Synchronization: With two or more RWT's on a vehicle, it is useful to synchronize the transition. Before changing shape, each wheel track system waits for the other to complete power transition and positioning.

The invention has been described with reference to specific embodiments, including specific components, sizes and tolerances. It should be realized by one of skill in the art that variations can be made to the described embodiments while remaining within the contemplated scope of the invention, which is specified by the claims which follow.

We claim:

1. A reconfigurable wheel-track device for a moving vehicle, comprising:
   an outer tread; and
   an assembly comprising:
      one or more drive mechanisms for driving the outer tread;
      one or more support mechanisms for supporting the outer tread in a desired shape; and
      a reconfiguration mechanism for reconfiguring the assembly between a wheel mode and a track mode;
      wherein, when in wheel mode, the assembly and the outer tread synchronously rotate; and
      wherein, during the transition from wheel mode to track mode, the assembly is stopped from rotating, but the outer tread is still allowed to rotate.

2. The device of claim 1 wherein, the wheel-track device switches between wheel mode and track mode when the vehicle is in motion.

3. The device of claim 1 wherein, when in track mode, the assembly is locked to the vehicle to prevent rotation and the outer tread is allowed to rotate.

4. The device of claim 1, the drive mechanism comprising:
   a plurality of sprockets configured to translate linearly along a line extending from the center of the assembly to the outer tread;
   a plurality of drive shafts corresponding to the plurality of sprockets;
   a drive gear coupled to the plurality of drive shafts;
   a clutch, connecting the drive gear to a rotating axle of the vehicle; and
   a plurality of actuators corresponding to the plurality of sprockets, for linearly translating the sprockets.

5. The device of claim 4 wherein the plurality of drive shafts are splined to allow expansion and retraction of the drive shafts as the sprockets are linearly translated.

6. The device of claim 4 wherein, during a transition from wheel mode to track mode, the plurality of sprockets translate outwardly from the center of the assembly such as to tangentially contact the outer tread.

7. The device of claim 4 wherein, during a transition from track mode to wheel mode, the plurality of sprockets translate inwardly toward the center of the assembly such as to disengage the sprockets from the outer tread.

8. The device of claim 1, the support mechanism comprising:
   a plurality of curved members having rollers disposed on an outer surface thereof,
   a plurality of spring-loaded rods corresponding to the plurality of curved members;
   wherein the curved members are rotatably mounted to the assembly such as to be able to rotate to accommodate different shapes of the outer tread.

9. The device of claim 8, the spring-loaded rods and the rotatable mounting allowing the curved members to flex as the outer tread is loaded.

10. The device of claim 9 wherein, when in wheel mode, the curved members are positioned such as to support the outer tread in a circular configuration.

11. The device of claim 9 wherein, when in track mode, the curved members are positioned such as to support the outer tread in a tracked configuration.

12. The device of claim 11 wherein, when in track mode, the rollers disposed on the outer surface of the curved members allow the outer tread to rotate with respect to the assembly.

13. The device of claim 1, the reconfiguration mechanism comprising:
   a wheel clutch coupling the assembly to the structure of the vehicle; and
   a sprocket drive clutch coupling the assembly to an axle of the vehicle.

14. The device of claim 13 wherein, when in wheel mode:
   the wheel clutch is released, allowing the assembly and the outer tread to rotate; and
   the sprocket drive clutch is engaged, locking the assembly to the axle of the vehicle such that the assembly is rotated by the rotation of the axle.

15. The device of claim 14 wherein, when transitioning from wheel mode to track mode:
   the wheel clutch starts to engage, slowing the rotation of the assembly; and
   the sprocket drive clutch is disengaged, releasing the assembly from the axle of the vehicle.

16. The device of claim 15 wherein, when in track mode:
   the wheel clutch fully engages, locking the assembly to the vehicle and preventing it from rotating; and
   the axle of the vehicle drives the drive mechanism, driving the outer tread to rotate.

17. The device of claim 4 wherein the drive mechanism further comprises three sprockets and further wherein the outer tread is forced into a triangular configuration when in track mode.

18. The device of claim 17 wherein the drive mechanism further comprises:
   a sprocket drive shaft, coupled to the axle of the vehicle via planetary differential; and
   a sprocket drive brake to lock the sprocket drive shaft to the planetary differential.

19. The device of claim 18 wherein the drive mechanism further comprises:
   a tri-lobe gearing housing the drive gears corresponding to the three sprockets and transmitting power from the sprocket drive shaft to the drive gears;
   wherein the sprocket drive shaft is coupled to the tri-lobe link housing via a spline.

* * * * *